United States Patent
Liao

(10) Patent No.: US 9,625,736 B2
(45) Date of Patent: Apr. 18, 2017

(54) VOICE COIL MOTOR ACTUATOR WITH ELECTROMAGNETS

(71) Applicant: HON HAI PRECISION INDUSTRY CO., LTD., New Taipei (TW)

(72) Inventor: Chia-Hung Liao, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/843,552

(22) Filed: Sep. 2, 2015

(65) Prior Publication Data

US 2016/0349530 A1 Dec. 1, 2016

(30) Foreign Application Priority Data

May 27, 2015 (TW) .................................. 104117071

(51) Int. Cl.
*G02B 27/64* (2006.01)
*G02B 7/02* (2006.01)
*H04N 5/232* (2006.01)

(52) U.S. Cl.
CPC ........... *G02B 27/646* (2013.01); *G02B 7/023* (2013.01); *H04N 5/23287* (2013.01)

(58) Field of Classification Search
CPC .................. G02B 27/64; G02B 27/646; G03B 2205/0007; G03B 2205/0015; G03B 2205/0023; G03B 2205/003; G03B 2205/0038; G03B 2205/0053; G03B 2205/0061; G03B 2205/0069; G03B 2205/0076; G03B 2205/0084; H04N 5/23248; H04N 5/23264; H04N 5/2328; H04N 5/23283; H04N 5/23287

USPC ...... 359/554, 555, 556, 557; 396/52, 53, 54, 396/55, 12, 13; 348/208.99, 208.4, 208.5, 348/208.6, 208.7, 208.8, 208.11

See application file for complete search history.

(56) References Cited

U.S. PATENT DOCUMENTS

| 8,319,839 B2* | 11/2012 | Lin | G02B 27/646 348/208.12 |
| 8,605,213 B2* | 12/2013 | Park | G02B 7/08 348/374 |
| 2011/0013895 A1* | 1/2011 | Chiang | G03B 17/00 396/55 |
| 2013/0286283 A1* | 10/2013 | Chou | H02K 41/0356 348/374 |

* cited by examiner

*Primary Examiner* — Arnel C Lavarias
(74) *Attorney, Agent, or Firm* — Steven M. Reiss

(57) ABSTRACT

A voice coil motor actuator includes a housing, a lens barrel, a frame, two elastic sheets and a carrier. The lens barrel is received in the frame, the frame is received in the housing, the two elastic sheets are arranged on the lens barrel, the carrier is arranged on one of the elastic sheets. A holding hole is opened on the lens barrel. Permanent magnets are arranged symmetrically on the lens barrel. The frame includes electromagnets. The magnet poles of the electromagnets and the magnet poles of the permanent magnets are spaced.

15 Claims, 6 Drawing Sheets

VOICE COIL MOTOR ACTUATOR WITH ELECTROMAGNETS

FIELD

The subject matter relates to a motor actuator, and particularly relates to a voice coil motor actuator.

BACKGROUND

Voice coil motor (VCM) technology has been widely used in many fields in recent years, especially in the auto focus camera module. In the VCM industry, the birth of optical image stabilizer (OIS) has been a great breakthrough in the field of anti shake technology. A general anti shake voice coil motor includes a flexible circuit board and copper wire coil, and the copper wire coil is always etched on the circuit board. A diameter of the coil can be 0.017 mm to reserve enough space for designing the OIS. However, the production capacity is limited, manufacturing is expensive, and the thickness of the coil will increase the height of the camera module.

BRIEF DESCRIPTION OF THE DRAWINGS

Implementations of the present technology will now be described, by way of example only, with reference to the attached figures.

DETAILED DESCRIPTION

Figure 1:
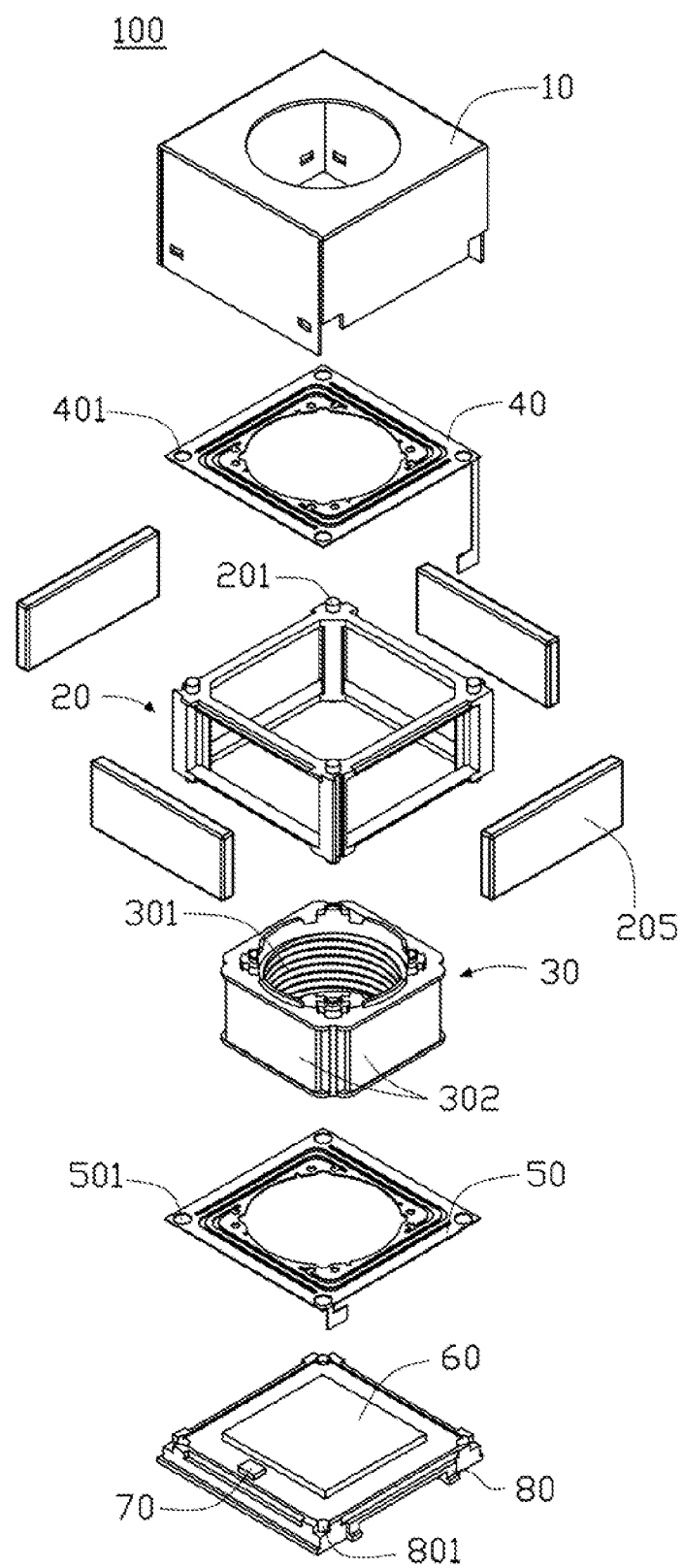
FIG. 1 is an exploded, isometric view of a voice coil motor actuator in accordance with an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures and components have not been described in detail so as not to obscure the related relevant feature being described. Also, the description is not to be considered as limiting the scope of the exemplary embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

Referring to FIG. 1, the voice coil motor actuator 100 in an exemplary embodiment includes a housing 10, a frame 20, a lens barrel 30, two elastic sheets 40, 50 and a carrier 80. The lens barrel 30 is received in the frame 20. The frame 20 is received in the housing 10. The two elastic sheets 40, 50 are arranged on two ends of the lens barrel 30. The carrier 80 is arranged on one of the elastic sheets 40, 50. The voice coil motor actuator 100 further includes an image sensor 60, a controller 70 and an angular velocity sensor (not shown in FIGs). The image sensor 60, the controller 70 and the angular velocity sensor are arranged on the carrier 80. In this exemplary embodiment, the carrier 80 is arranged on the elastic sheet 50.

A plurality of locating columns 201 are formed on the two ends of the frame 20. A plurality of locating holes 401, 501, 801 are defined on the elastic sheets 40, 50 and the carrier 80 respectively. The locating holes 401, 501, 801 correspond to the locating columns 201 of the frame 20. The elastic sheets 40, 50 and the carrier 80 are connected and fixed to the frame 20 via inserting the locating columns 201 into the locating holes 401, 501, 801 respectively.

In this exemplary embodiment, a number of the locating columns 201 on the two ends of the frame 20 is four respectively. However, the invention is not so limited, and the number of the locating columns 201 can be varied according to different requirements.

Figure 2:
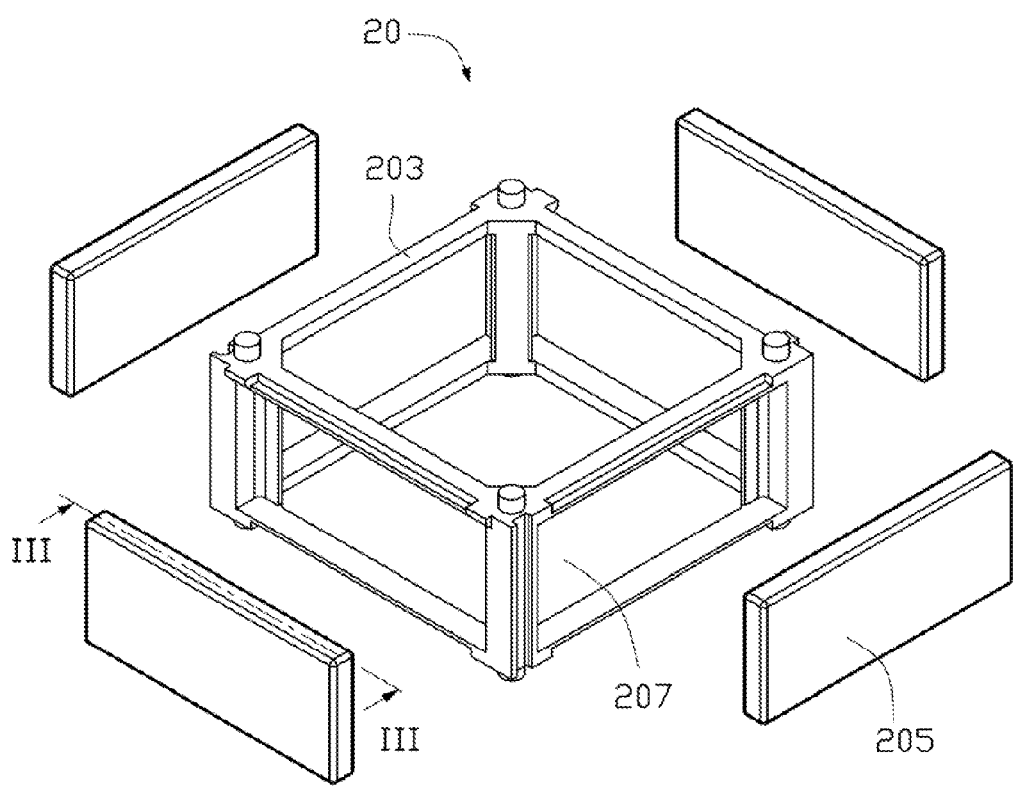
FIG. 2 is an enlarged view of a frame of the voice coil motor actuator in FIG. 1.

Referring to FIG. 2, the locating columns 201 extend from two ends of the frame 20. The frame 20 is substantially rectangular. The frame 20 includes a bracket 203 and a plurality of electromagnets 205. A plurality of square frames 207 are formed around a periphery of the bracket 203. Each square frame 207 is hollow. The square frames 207 correspond to the electromagnets 205. Each electromagnet 205 is received in a corresponding square frame 207. A number of the electromagnets 205 ranges from one to four. Preferably, each electromagnet 205 can be arranged between two adjacent square frames 207. In this exemplary embodiment the electromagnets 205 are arranged to surround the frame 20.

Figure 3:
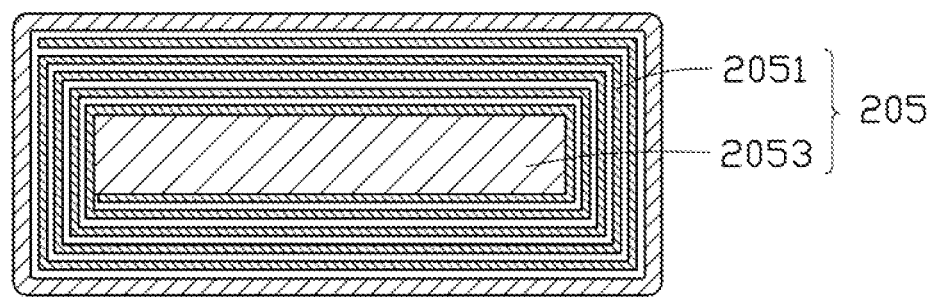
FIG. 3 is a cross-section view of an electromagnet of the frame in FIG. 2, taken along line III-III.

Referring to FIG. 3, each electromagnet 205 includes an iron core 2053 and a coil 2051. The iron core 2053 is arranged in center of the electromagnet 205. The coil 2051 is formed to enwind the iron core 2053. The coil 2051 is made of conductive materials.

Figure 4:
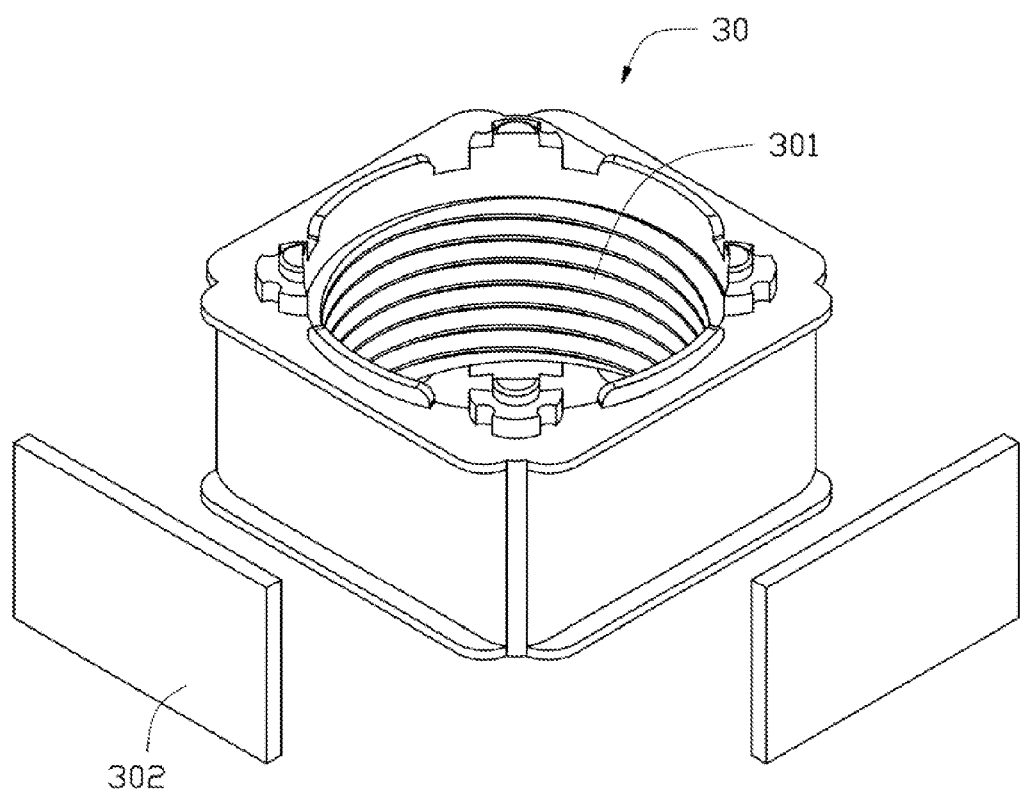
FIG. 4 is a partly exploded view of a lens barrel of the voice coil motor actuator in FIG. 1.
Figure 5:
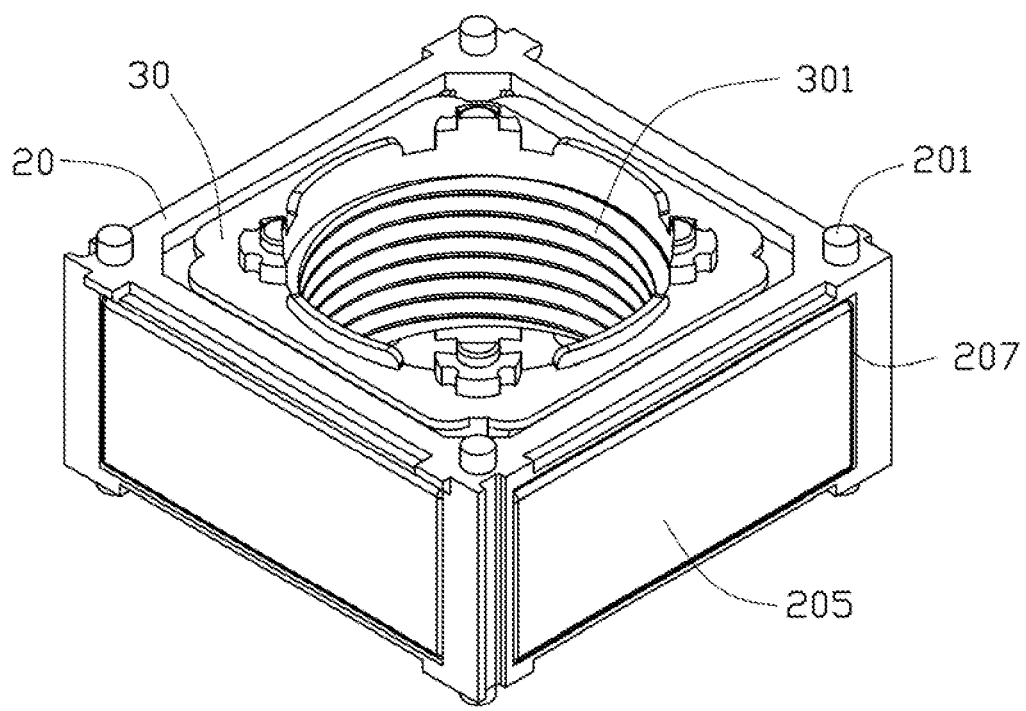
FIG. 5 is an assembled, isometric view of the frame and the lens barrel of the voice coil motor actuator in FIG. 1.
Figure 6:
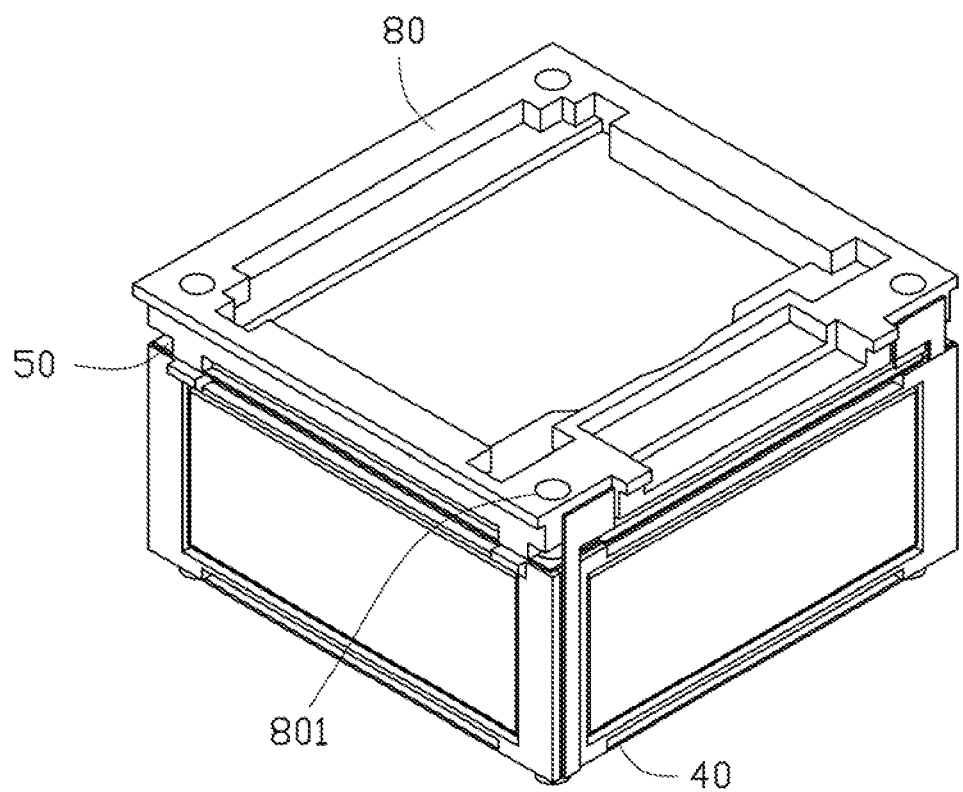
FIG. 6 is an assembled, isometric view of the voice coil motor actuator in FIG. 1 without a housing.

Referring to FIG. 1 and FIG. 4, a holding hole 301 is defined in the lens barrel 30 to receive a lens (not shown in FIGs). The lens barrel 30 is substantially rectangular. Four permanent magnets 302 are arranged on four side walls of the lens barrel 30. The permanent magnets 302 are arranged symmetrically and surround the lens barrel 30. The permanent magnets 302 have the same sizes and shapes. A pole direction of each permanent magnet 302 is on a vertical of a corresponding side wall of the lens barrel 30.

Each electromagnet 205 is space apart from and faces a corresponding permanent magnet 302. A magnet pole of the electromagnet 205 is spaced apart from a magnet pole of the permanent magnet 302. The tangential direction of the magnetic field force generated by the magnet pole of the electromagnet 205 and the magnet pole of the permanent magnet 302 to the same object is on the same line. The electromagnets 205 can be electronically connected to the carrier 80 by wires (not shown in FIGs).

The image sensor 60 is arranged on the center of the carrier 80. The image sensor 60 is spaced apart from and faces to the lens barrel 30. In this exemplary embodiment, the carrier 80 is a flexible circuit board.

The controller 70 is arranged on the carrier 80. The controller 70 and the image sensor 60 are arranged on the same side of the carrier 80. The controller 70 is electronically connected to the coil 2053 and the angular velocity sensor. The controller 70 is used for controlling the sizes and direction of the electromagnets 205.

Referring to FIGS. 2, 4, 5 and 6, the electromagnets 205 are fixed in the square frames 207. The permanent magnets 302 are arranged on the side walls of the lens barrel 30. The lens barrel 30 is received in the frame 20. The magnet pole of each electromagnet 205 is spaced apart from and faces the magnet pole of the permanent magnet 302. The frame 20, the elastic sheets 40, 50 and the carrier 80 are fixed by the locating columns 201. As shown in FIG. 1, the locating columns 201 are matched with the locating holes 401, 501 and 801. The locating columns 201 and the locating holes 401, 501, 801 are fixed by dispensing.

The magnitude and direction of the magnetic force of the electromagnets 205 can be adjusted through controlling the current size and direction of the coil 2053 of a corresponding electromagnet 205 by the controller 70.

When the image sensor 60 shakes, the angular velocity sensor detects and produces a shook signal. The shook signal is transmitted to the controller 70. And then the current size and direction of the coil 2053 is controlled by the controller 70 based on the shook signal. A repulsive force or an attractive force is produced between the electromagnet 205 and a corresponding permanent magnet 302. Because the permanent magnets 302 are fixed in the lens barrel 30, the repulsive force or the attractive force is active on the lens barrel 30, thereby adjusting the position of the lens barrel 30 relative to the image sensor 60 to achieve jitter compensation. In other words, the controller 70 controls flow and direction of current through the electromagnets 205 and the permanent magnets 302 to compensate for movement of the lens barrel 30.

The elastic sheets 40, 50 elastically resist movement of the lens barrel 30 and bias it to a default position. When the lens barrel 30 moves relative to the frame 20 due to camera jitter, the elastic deformation of the elastic sheet 40 or 50 biases the lens barrel 30 back into the default position with then jitter subsides.

Compared to the traditional motor actuators, the electromagnets 205 of the voice coil motor actuator 100 in the present disclosure are arranged in the frame 20. The magnetic force magnitude and direction are adjusted by controlling the current size and direction of the coils 2053 of the electromagnets 205, and a magnetic field force is produced between the coil 2053 and a corresponding permanent magnet 302, thereby adjusting the position of the lens barrel 30 to achieve the purpose of optical image stabilization.

Additionally, the voice coil motor actuator 100 does not require etched the copper wire coil on a circuit board, which reduces thickness, assembly time and assembly cost.

The exemplary embodiment shown and described above is only an example. Many details are often found in the art such as the other features of the voice coil motor actuator. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the exemplary embodiments described above may be modified within the scope of the claims.

What is claimed is:

1. A voice coil motor actuator, comprising:
a housing;
a frame received in the housing;
a lens barrel received in the frame;
two elastic sheets arranged on two ends of the frame;
a carrier arranged on one of the elastic sheets;
a plurality of permanent magnets being symmetrically arranged on and surrounding the lens barrel; and
a plurality of electromagnets being fixed on the frame, and a magnetic pole of each electromagnet being spaced apart from and facing a corresponding permanent magnet;
wherein each electromagnet comprises an iron core and a coil, the iron core is arranged in a center of the electromagnet, and the coil is wound around the iron core.

2. The voice coil motor actuator of claim 1, wherein a controller is arranged on the carrier, a magnitude and direction of magnetic force of the electromagnets are adjusted by controlling a current size and direction of the coils of the electromagnets, and a magnetic force is produced between the coil and a corresponding permanent magnet, thereby adjusting a position of the lens barrel.

3. The voice coil motor actuator of claim 1, wherein the carrier is a flexible circuit board.

4. The voice coil motor actuator of claim 3, wherein an image sensor is arranged on the carrier, the image sensor is spaced apart from and faces the lens barrel.

5. The voice coil motor actuator of claim 1, wherein the electromagnets are arranged on and surround the frame, and each electromagnet corresponds to one permanent magnet.

6. The voice coil motor actuator of claim 5, wherein the frame comprises a bracket, a plurality of square frames are formed around a periphery of the bracket, and each square frame is hollow.

7. The voice coil motor actuator of claim 6, wherein the square frames correspond to the electromagnets, and each electromagnet is received in a corresponding square frame.

8. The voice coil motor actuator of claim 1, wherein a plurality of locating columns are formed on the two ends of the frame, a plurality of locating holes are defined on the elastic sheets and the carrier, and the elastic sheets and the carrier are connected and fixed to the frame via inserting the locating columns into the locating holes.

9. The voice coil motor actuator of claim 8, wherein the locating columns and the locating holes are fixed by dispensing.

10. A voice coil motor actuator, comprising:
a controller;
a frame comprising a bracket having square frames around a periphery thereof;
a lens barrel received in the frame;
a plurality of permanent magnets being symmetrically arranged on and surrounding the lens barrel; and
a plurality of electromagnets being fixed in the square frames of the frame, a magnet pole of each of the electromagnets being spaced apart from and facing a corresponding one of the permanent magnets;

wherein the controller controls a flow and direction of current through the electromagnets to compensate for movement of the lens barrel; and wherein each electromagnet comprises an iron core and a coil, the iron core is arranged in a center of the electromagnet, and the coil is wound around the iron core.

11. The voice coil motor actuator of claim 10, further comprising a housing, wherein the frame is received in the housing.

12. The voice coil motor actuator of claim 10, further comprising two elastic sheets arranged on two ends of the frame, wherein a plurality of locating holes are defined on the elastic sheets, a plurality of locating columns are formed on the two ends of the frame, and the elastic sheets are connected and fixed to the frame via inserting the locating columns into the locating holes.

13. The voice coil motor actuator of claim 12, further comprising a carrier arranged on one of the elastic sheets, wherein the carrier is a flexible circuit board, and the controller is arranged on the carrier.

14. The voice coil motor actuator of claim 13, wherein a plurality of locating holes are defined on the carrier, and the carrier is connected and fixed to the frame together with the elastic sheet via inserting the locating columns into the locating holes.

15. The voice coil motor actuator of claim 13, wherein an image sensor is arranged on the carrier, and the image sensor is spaced apart from and faces the lens barrel.

\* \* \* \* \*